United States Patent

[11] 3,532,140

| [72] | Inventor | Richard G. Hoffman<br>Milford, Michigan |
|---|---|---|
| [21] | Appl. No. | 748,828 |
| [22] | Filed | July 30, 1968 |
| [45] | Patented | Oct. 6, 1970 |
| [73] | Assignee | By mesne assignment to General Motors Corporation, Detroit Mich., a corporation of Delaware |

[54] TIRE BLOWOUT SIMULATOR FOR AUTOMOTIVE VEHICLES
4 Claims, 6 Drawing Figs.

[52] U.S. Cl............................................................ 141/65,
152/415
[51] Int. Cl. ........................................................ B65b 31/04
[50] Field of Search............................................ 141/8, 59,
64, 65; 53/84; 55/29/(Considered), 384/(Considered),
387/(Considered); 230/244, 229; 152/415, 416,
417; 251/43; 137/223/(Considered)

[56] References Cited
UNITED STATES PATENTS

| 2,242,207 | 5/1941 | Bowers..................... | 152/415 |
| 2,359,162 | 9/1944 | Sherbondy................ | 141/65 |
| 2,931,414 | 4/1960 | Jankowski................ | 152/417 |

*Primary Examiner*—Herbert F. Ross
*Attorney*—W. E. Finken and Herbert Furman

ABSTRACT: An automotive vehicle attachment enabling selective operation to simulate blowout of a tire on the vehicle. The attachment includes a valve piston having opposite ends of different areas enabling the application of a differential force to the larger area end from a single air pressure source so that the piston can be moved to a seated position to keep the vehicle tire inflated. When the air supply from the pressure source is suddenly terminated and the larger end of the piston is vented to the atmosphere, the air pressure in the tire quickly moves the piston to a vent position in which air from the tire is suddenly exhausted to atmosphere to simulate a blowout condition.

Patented Oct. 6, 1970

INVENTOR
RICHARD G. HOFFMAN
BY
Olsen and Stephenson
ATTORNEYS

Patented Oct. 6, 1970

INVENTOR
RICHARD G. HOFFMAN

BY
Olsen and Stephenson
ATTORNEYS 3,532,140

TIRE BLOWOUT SIMULATOR FOR AUTOMOTIVE VEHICLES

BACKGROUND OF THE INVENTION

Vehicle attachments for simulating tire blowout conditions are known. However, prior attachments for this purpose have operated on a differential pressure principle thereby creating certain high pressure hazards and precluding easy tire inflation. Furthermore, known devices of this type have involved definite difficulties in manufacture and installation.

SUMMARY OF THE INVENTION

The blowout simulator attachment of this invention utilizes a sliding valve piston which is tapered so that the area on one end of the piston is less than the area on the opposite end. An internal passage of the piston communicates these different area ends of the piston. As a result, the same air pressure on both ends of the piston will maintain the piston in a seated position because of the differential area. Consequently, the attachment of this invention is operated at an air pressure corresponding to the air pressure in the vehicle tire with which the attachment is associated. The result is a simplified blowout simulator attachment which is easily operated, does not interfere with tire inflation, and is readily manufacturable at an economical cost.

Further objects, features and advantages of this invention will become apparent from a consideration of the following description, the appended claims, and the accompanying drawing in which:

Figure 1:
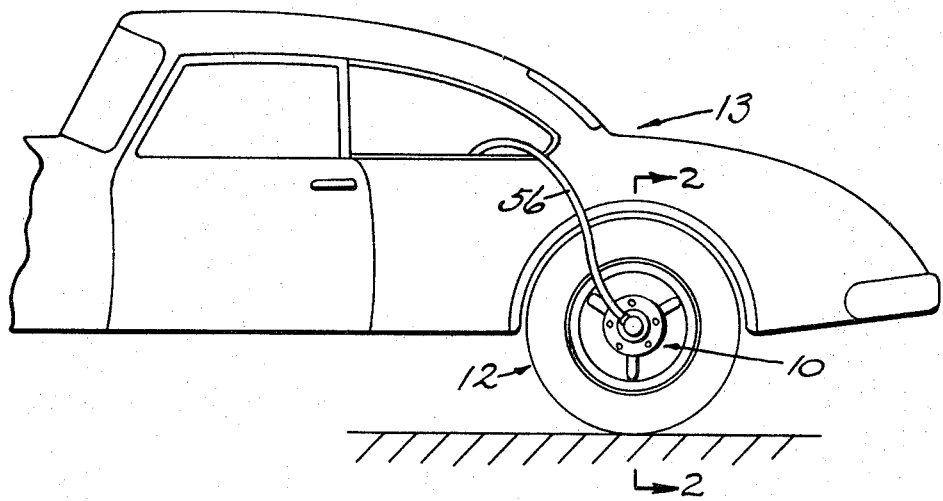
FIG. 1 is a fragmentary side view of an automobile showing the blowout simulator attachment of this invention in assembly relation therewith.
Figures 2, 3:
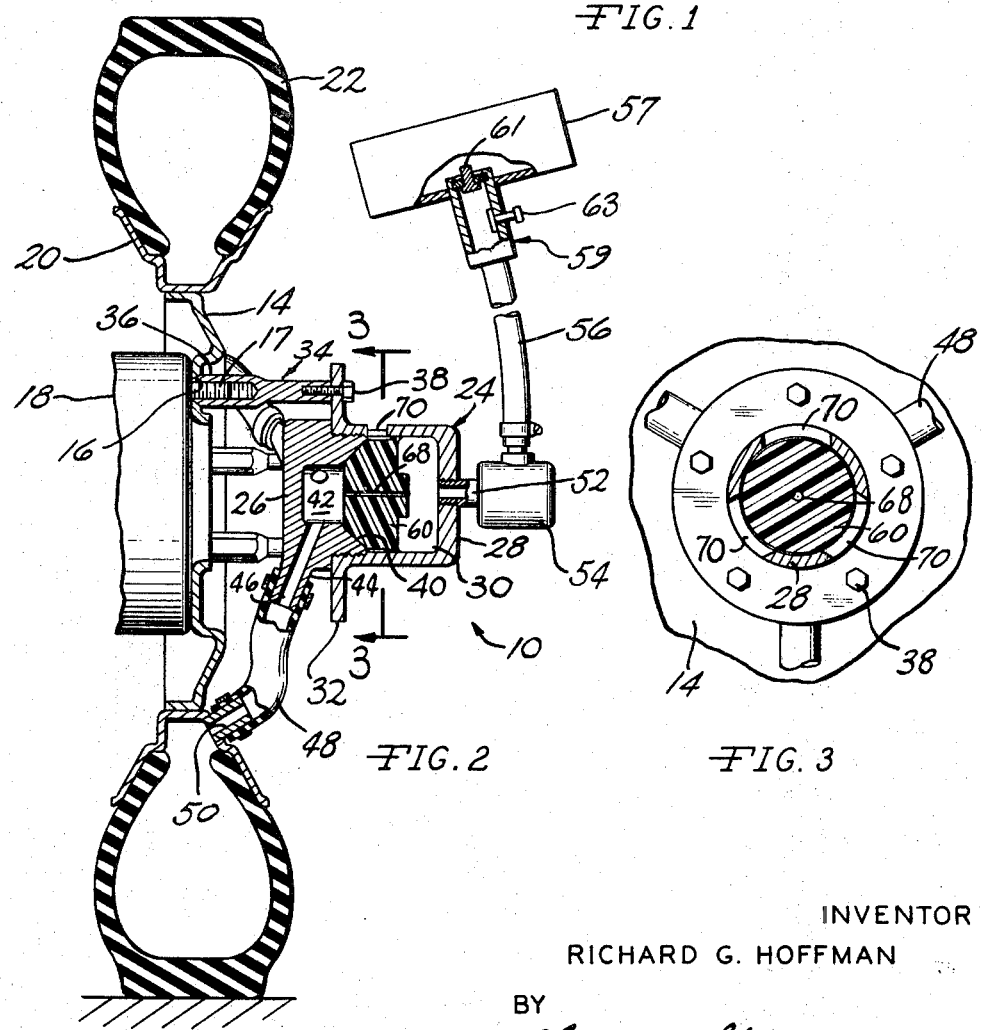
FIG. 2 is an enlarged fragmentary transverse sectional view of the attachment of this invention and the wheel and tire assembly on which it is mounted as seen from substantially the line 2—2 of FIG. 1, showing the tire in an inflated condition.
FIG. 3 is a fragmentary transverse sectional view of a portion of the attachment of this invention as seen from substantially the line 3—3 in FIG. 2.
Figure 5:
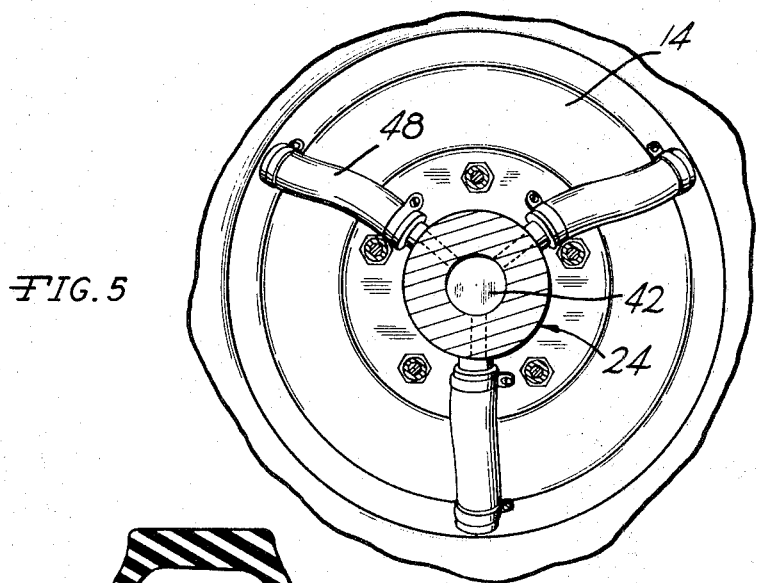
FIG. 5 is a transverse sectional view of the attachment of this invention as seen from substantially the line 5—5 in FIG. 4.

With reference to the drawing, the blowout simulator attachment of this invention, indicated generally at 10, is shown in FIG. 1 mounted on the left-rear wheel and tire assembly 12 for an automotive vehicle 13. As shown in FIG. 2, the wheel and tire assembly 12 includes the usual wheel 14 having openings 16 through which the usual threaded mounting studs 17, only one of which is shown, on the wheel spindle 18 extend for wheel mounting purposes. The wheel 14 has the usual rim 20 on which a tubeless tire 22 is mounted in the conventional manner.

The attachment 10 of this invention includes a hollow housing or casing 24 consisting of a base member 26 and a cover member 28 which are threadably connected so as to form an internal cylinder 30. The cover member 28 has a radially extending flange 32 which is mounted on the wheel mounting studs 17 by means of bolt assemblies 34. Each assembly 34 includes a stud 36 which is internally threaded at its ends, one end being threaded onto the mounting stud 17 so as to retain the wheel 14 in mounted position and perform the same function as the usual mounting nuts provided for this purpose. A screw 38 extends through the flange 32 into the opposite end of the stud 36 for mounting the flange 32 on the bolt assemblies 34 in an outwardly spaced relation with the wheel 14.

The base member 26 in the housing 24 is formed at one end with a frusto-conical valve seat 40 and an internal cavity 42 which communicates with the small end of the seat 40. The base member 26 is also provided with three radially extending bosses 44 formed with internal passages 46 which communicate with the cavity 42. Flexible hoses 48, mounted at one of their ends on the bosses 44, are mounted at their opposite ends on hollow nipples 50 which are attached to the wheel rim 20 so as to communicate with the interior of the tubeless tire 20. Thus, the flexible hoses 48 provide for a continuous fluid communication between the cavity 42 and the interior of the tubeless tire 22.

The cover member 28 in the casing 24 is connected to an air inlet tube 52 on which a conventional rotary joint unit 54 is mounted. The unit 54 enables rotation of the tube 52 with the wheel 14 and relative to the unit 54 and to a compressed air supply hose 56 connected to the unit 54. The air supply hose 56 is connected, at a position inside the vehicle 14, to a compressed air tank 57, shown diagrammatically in FIG. 2, through a manually operable control valve unit 59, also shown diagrammatically in FIG. 2.

Figure 4:
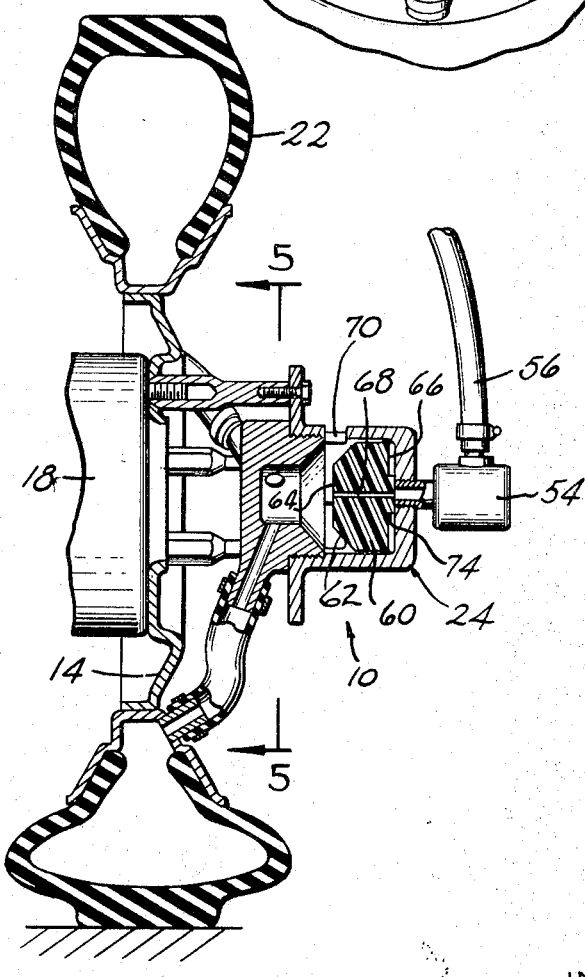
FIG. 4 is a transverse sectional view of the attachment of this invention and the wheel and tire assembly on which it is mounted, illustrated similarly to FIG. 2, showing the attachment in condition for deflating the tire.

A control valve piston 60 (FIGS. 2 and 4) is slidably mounted in the cylinder 30 for movement between the seated position illustrated in FIG. 2 and the unseated position shown in FIG. 4. The cylinder 60 is preferably formed of a low friction plastic material such as Teflon and is provided at one end with a substantially frusto-conical surface 62 shaped like the valve seat 40. The provision of the surface 62 causes the piston 60 to have an inner end 64 which is of an area substantially less than the opposite or outer end 66. A passage 68 extends axially through the piston 60 so that the piston end surfaces 64 and 66 are in constant fluid communication. As a result, when the piston 60 is in its seated position shown in FIG. 2, and the air pressures on the end surfaces 64 and 66 are equal, the piston 60 will be maintained in its seated position because of the net force generated by the difference in the areas of the end surfaces 64 and 66. However, when the tube 52 is suddenly vented to atmosphere, the pressure on the surface 66 will be suddenly decreased, and the piston 60 will be moved by the air pressure on the end surface 64 to the unseated position shown in FIG. 4. In this position of the piston 60, the cavity 42 in the casing 24 communicates directly with the atmosphere through radial slots 70 formed in the cover member 28 adjacent the valve seat 40.

Figure 6:
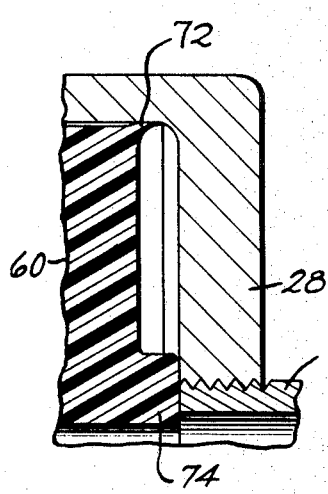
FIG. 6 is a fragmentary detail sectional view of a portion of the attachment of this invention.

As shown particularly in FIG. 6, the piston 60 is of generally cylindrical configuration and is formed at its outer end, at the outer edge of the surface 66, with a thin bendable lip 72 which extends radially and axially outwardly into tight engagement with the inner surface of the cover member 28. The lip 72 is of a size such that when installed in the cover member 28 it must be deflected a slight distance radially inwardly to thereby insure a tight seal between the piston 60 and the cover member 28 to preclude leakage of air from the cylinder 30 outwardly through the slots 70 when the piston 60 is in its seated position shown in FIG. 2. To prevent damage to the lip 72 when the piston 60 is suddenly unseated, the piston 60 is formed with an axially outwardly extending projection 74 at the surface 66. When the piston 60 is unseated, the projection 74 engages the cover member 28 so as to prevent the lip 72 from being forcefully moved against the cover 28.

In the operation of the attachment 10, assume that a blowout simulation operation has just been completed so that the tire 22 is deflated and the valve piston 60 is in the position shown in FIG. 4. The control valve unit 59 is connected to the tank 57 providing for opening of valve 61 in unit 59 and flow of air from tank 57 through hose 56 into the tube 52. Compressed air is then supplied through the tube 52 to the cylinder 30 to thereby move the piston 60 to its seated position shown in FIG. 2. Continued supply of compressed air to the casing 24 through the tube 52 results in flow of air under pressure through the passage 68 to the cavity 42 and thence to the interior of the tire 22 through the flexible hoses 48. This supply of air is continued until the tire 22 is inflated to the desired extent illustrated in FIG. 2. At such time, the valve unit 59 is manually removed from the tank 57 providing for automatic closing of valve 61 to maintain air pressure in tire 22 and housing 24.

Under these conditions, the air pressures on the piston end surfaces 64 and 66 are equal and these pressures are equal to the air pressure inside the tire 22. By virtue of the fact that the area of the end surface 66 is substantially greater than the area of the end surface 64, the total force exerted on the piston 60 tending to maintain the piston 60 in a seated position is substantially greater than the oppositely directed force on the surface 64 tending to unseat the piston 60. As a result, the piston 60 will be maintained in its seated position shown in FIG. 2. The vehicle 14 can then be driven normally with the wheel and tire assembly 12 and the attachment 10 rotating relative to the universal joint unit 54.

Assume that it is now desired to simulate a blowout condition of the tire 22. The control valve unit 59 inside the vehicle 14 is actuated by manually opening a valve 63 therein to cause compressed air in the supply hose 56 to vent to atmosphere through unit 59. The pressure on the piston end surface 66 is thus suddenly relieved, so that the air pressure on the piston end surface 64 is effective to rapidly move the piston 60 to its unseated position shown in FIG. 4. In this position of the piston 60, the interior of the tire 22 is rapidly vented to atmosphere through the slots 70 in the housing 24. This results in rapid deflation of the tire 22 thereby simulating a blowout of the tire 22. Such simulation is desirable in vehicle driver training courses.

The above-described cycle commencing with re-inflation of the tire 22 can then be repeated.

From the above description, it is seen that this invention provides a blowout simulator attachment for vehicle wheel and tire assemblies which consist of relatively few parts so that it is economical to manufacture and maintain over a prolonged service life. In the event the tire 22 should lose air pressure, when standing overnight, for example, the tire 22 is readily re-inflated by compressed air supplied through the supply hose 56. By virtue of the provision of the flexible annular lip 72 on the piston 60, loss of air pressure on the larger side of the piston 60 is positively precluded so that a blowout condition cannot be accidentally obtained. It is to be understood that while the valve seat 40 and the piston surface 62 have been described as being substantially frusto-conical, this description is inclusive of slightly curved contours to these surfaces which enhances the tight seating of surface 62 on seat 40.

It will be understood that the tire blowout simulator attachment for automotive vehicles which is herein disclosed and described is presented for purposes of explanation and illustration and is not intended to indicate limits of the invention, the scope of which is defined by the following claims.

I claim:

1. In a tire blowout simulator attachment for automotive vehicles, a hollow housing having a valve seat formed therein, a valve piston slidably mounted in said housing and having a pair of end surfaces one of which is larger than the other, said piston being movable to a seated position engaged with said seat and having a passage extending therethrough so that the ends of said passage terminate at said surfaces, said housing having a cavity therein communicating with the smaller one of said piston end surfaces, passage means in said housing communicating with said cavity and adapted to communicate with the interior of a tire with which said attachment is associated, said housing having an inlet opening for air under pressure communicating with the larger one of said piston end surfaces and vent opening means intermediate said seat and said inlet opening located so that said vent opening means is closed by said piston in the seated position thereof.

2. An attachment according to claim 1 wherein said seat is an annular substantially frusto-conical surface, and said piston is substantially cylindrical in shape having a substantially frusto-conical portion commencing at said smaller end surface and shaped to seat in a fluid tight relation on said valve seat.

3. An attachment according to claim 2 wherein said piston has a bendable lip at the peripheral outer edge of said larger piston end surface, said lip extending radially outwardly from said edge into fluid tight sliding engagement with said housing.

4. An attachment according to claim 3 wherein said piston is formed at said larger end surface with a projection extending in a direction axially of said piston for engagement with said housing to limit movement of said piston in a direction away from said seat.